United States Patent
Ishii et al.

(10) Patent No.: US 12,228,059 B2
(45) Date of Patent: Feb. 18, 2025

(54) GAS TURBINE FACILITY AND METHOD FOR SUPPRESSING DISCHARGE OF AMMONIA FROM GAS TURBINE FACILITY

(71) Applicant: MITSUBISHI HEAVY INDUSTRIES, LTD., Tokyo (JP)

(72) Inventors: Hiromi Ishii, Tokyo (JP); Ryo Ikeda, Tokyo (JP); Akira Hattori, Tokyo (JP); Hiroyuki Takeishi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/575,948

(22) PCT Filed: Jun. 16, 2022

(86) PCT No.: PCT/JP2022/024074
§ 371 (c)(1),
(2) Date: Jan. 2, 2024

(87) PCT Pub. No.: WO2023/286516
PCT Pub. Date: Jan. 19, 2023

(65) Prior Publication Data
US 2024/0337207 A1    Oct. 10, 2024

(30) Foreign Application Priority Data

Jul. 13, 2021  (JP) ................. 2021-115757

(51) Int. Cl.
*F02C 3/22*      (2006.01)
*B01D 53/18*     (2006.01)
(Continued)

(52) U.S. Cl.
CPC ............. *F01N 3/08* (2013.01); *B01D 53/18* (2013.01); *B01D 53/75* (2013.01);
(Continued)

(58) Field of Classification Search
CPC .... F02C 3/22; F02C 3/30; F02C 7/222; F02C 7/232; F02C 9/26; F02C 9/263; F02C 9/40; F01K 21/04
See application file for complete search history.

(56) References Cited

U.S. PATENT DOCUMENTS

| | | | |
|---|---|---|---|
| 11,808,209 B1 * | 11/2023 | Sobanski | F02C 6/18 |
| 2015/0020529 A1 * | 1/2015 | Hoskin | F02D 35/0092 60/39.5 |

(Continued)

FOREIGN PATENT DOCUMENTS

| | | | |
|---|---|---|---|
| AU | 2022312781 A1 * | 11/2023 | C01B 3/047 |
| CN | 106285845 B * | 4/2020 | F01D 15/10 |

(Continued)

OTHER PUBLICATIONS

International Search Report issued Sep. 6, 2022 in corresponding International (PCT) Application No. PCT/JP2022/024074, with English translation.

(Continued)

*Primary Examiner* — Craig Kim
(74) *Attorney, Agent, or Firm* — Wenderoth, Lind & Ponack, L.L.P.

(57) ABSTRACT

A gas turbine facility includes: a gas turbine; an ammonia supply device that supplies ammonia to a combustor of the gas turbine; a flow path forming frame forming an exhaust gas flow path through which exhaust gas from the gas turbine flows; a sprinkling device having a sprinkler that sprinkles water into the exhaust gas flow path; and a sprinkling controller that controls an operation of the sprinkling device. The sprinkling controller instructs the sprinkling device to start sprinkling the water on condition that an instruction to start supply of the ammonia to the combustor (Continued)

from the ammonia supply device or an instruction to stop the supply of the ammonia is received.

10 Claims, 6 Drawing Sheets

(51) Int. Cl.
  *B01D 53/75* (2006.01)
  *B01D 53/86* (2006.01)
  *C02F 1/00* (2023.01)
  *C02F 1/66* (2023.01)
  *F01N 3/08* (2006.01)
  *F02C 3/30* (2006.01)
  *C02F 101/16* (2006.01)
  *C02F 103/18* (2006.01)

(52) U.S. Cl.
  CPC ......... *B01D 53/8631* (2013.01); *C02F 1/008* (2013.01); *C02F 1/66* (2013.01); *F02C 3/22* (2013.01); *F02C 3/30* (2013.01); *B01D 2252/103* (2013.01); *B01D 2257/404* (2013.01); *B01D 2257/406* (2013.01); *C02F 2101/16* (2013.01); *C02F 2103/18* (2013.01); *C02F 2209/14* (2013.01)

(56) References Cited

U.S. PATENT DOCUMENTS

| | | | | |
|---|---|---|---|---|
| 2016/0376956 | A1* | 12/2016 | Kulkarni | F01N 3/04 60/39.5 |
| 2017/0218790 | A1* | 8/2017 | Zhang | F01D 21/003 |
| 2020/0032676 | A1* | 1/2020 | Nose | F23R 3/36 |
| 2020/0047118 | A1 | 2/2020 | Gehrke et al. | |
| 2024/0060645 | A1* | 2/2024 | Medina | F02C 7/224 |

FOREIGN PATENT DOCUMENTS

| | | | | |
|---|---|---|---|---|
| EP | 2826979 | A1 * | 1/2015 | ......... B01D 53/8625 |
| EP | 3540197 | B1 * | 8/2022 | ............. F01K 23/10 |
| JP | 2002-253927 | | 9/2002 | |
| JP | 2003-120418 | | 4/2003 | |
| JP | 2004-036983 | | 2/2004 | |
| JP | 2014-95370 | | 5/2014 | |
| JP | 2015-4284 | | 1/2015 | |
| JP | 2015-190466 | | 11/2015 | |
| JP | 2017-100072 | | 6/2017 | |
| JP | 2017-124385 | | 7/2017 | |
| JP | 2017-131867 | | 8/2017 | |
| JP | 2018-162752 | | 10/2018 | |
| JP | 2019-178840 | | 10/2019 | |
| JP | 2020-517441 | | 6/2020 | |
| WO | WO-2008155242 | A1 * | 12/2008 | ............... F02C 3/30 |
| WO | WO-2023171048 | A1 * | 9/2023 | |
| WO | WO-2023176050 | A1 * | 9/2023 | |
| WO | WO-2023181512 | A1 * | 9/2023 | |

OTHER PUBLICATIONS

Written Opinion issued Sep. 6, 2022 in corresponding International (PCT) Application No. PCT/JP2022/024074, with English translation.

* cited by examiner

GAS TURBINE FACILITY AND METHOD FOR SUPPRESSING DISCHARGE OF AMMONIA FROM GAS TURBINE FACILITY

TECHNICAL FIELD

The present disclosure relates to a gas turbine facility using ammonia as a fuel, and a method for suppressing discharge of ammonia from a gas turbine facility.

Priority is claimed on Japanese Patent Application No. 2021-115757 filed on Jul. 13, 2021, the content of which is incorporated herein by reference.

BACKGROUND ART

A gas turbine includes a compressor that compresses air, a combustor that burns a fuel in the air compressed by the compressor to generate a combustion gas, and a turbine that is driven by the combustion gas.

PTL 1 discloses a gas turbine facility that uses ammonia as a fuel to be supplied to a combustor. In a case where ammonia is used as a fuel for a gas turbine, when ammonia is burned, a portion of nitrogen forming ammonia becomes NOx. Therefore, in this gas turbine facility, a denitration apparatus is provided in a flow path through which exhaust gas from the gas turbine flows.

CITATION LIST

Patent Literature

[PTL 1] Japanese Unexamined Patent Application Publication No. 2019-178840

SUMMARY OF INVENTION

Technical Problem

In a case where ammonia is used as a fuel for a gas turbine, it is desirable to suppress discharge of not only NOx but also unburned ammonia itself to the outside.

Therefore, an object of the present disclosure is to provide a technique capable of, in a case where ammonia is used as a fuel for a gas turbine, suppressing discharge of ammonia to the outside.

Solution to Problem

A gas turbine facility as an aspect for achieving the above object includes:
a gas turbine having a combustor; an ammonia supply device that supplies ammonia to the combustor; a flow path forming frame forming an exhaust gas flow path through which exhaust gas from the gas turbine flows; a sprinkling device that is disposed in the exhaust gas flow path and that has a sprinkler that sprinkles water into the exhaust gas flow path; and a sprinkling controller that controls an operation of the sprinkling device. The sprinkling controller instructs the sprinkling device to start sprinkling the water on condition that an instruction to start supply of the ammonia to the combustor from the ammonia supply device or an instruction to stop the supply of the ammonia is received.

The ammonia supply device generally includes an ammonia line through which ammonia as a fuel flows, and a fuel control valve provided in the ammonia line. In a process of starting the supply of ammonia from the ammonia supply device to the combustor, a portion in the ammonia line closer to the combustor than the fuel control valve is and on an inside of the fuel nozzle of the combustor are filled with the ammonia, and the ammonia starts to be injected into a combustion tube of the combustor. Thereafter, the ammonia in the combustion tube is ignited. During a period between when the fuel control valve receives the instruction to start the supply of ammonia and the fuel control valve opens and when the ammonia in the combustion tube is ignited, ammonia that flows out from the fuel control valve is exhausted from the gas turbine without being burned. This ammonia flows in the exhaust gas flow path. In addition, in a process of stopping the supply of ammonia to the combustor, after the fuel control valve receives the instruction to stop the supply of ammonia and the fuel control valve is closed, ammonia in the portion in the ammonia line closer to the combustor than the fuel control valve is and on the inside of the fuel nozzle of the combustor flows out into the combustion tube. This ammonia is also exhausted from the gas turbine without being burned.

Upon receiving the instruction to start the supply of ammonia or to stop the supply of ammonia, the sprinkling controller in this aspect instructs the sprinkling device to start sprinkling water. As a result, sprinkling water from the sprinkler into the exhaust gas flow path is started, and the ammonia flowing in the exhaust gas flow path is absorbed by the water.

Therefore, in this aspect, it is possible to suppress the discharge of ammonia to the outside in the process of starting the supply of ammonia from the ammonia supply device to the combustor or in the process of stopping the supply of ammonia.

A method for suppressing discharge of ammonia from a gas turbine facility as another aspect for achieving the above object is applied to the following gas turbine facility.

The gas turbine facility includes a gas turbine having a combustor, an ammonia supply device that supplies ammonia to the combustor, and a flow path forming frame forming an exhaust gas flow path through which exhaust gas from the gas turbine flows.

In the method for suppressing discharge of ammonia in this aspect, a sprinkling step of sprinkling water into the exhaust gas flow path is performed. In the sprinkling step, sprinkling the water into the exhaust gas flow path is started on condition that an instruction to start supply of the ammonia to the combustor from the ammonia supply device or an instruction to stop the supply of the ammonia is received.

In this aspect, similarly to the gas turbine facility in the above aspect, when the instruction to start supply of ammonia or to stop supply of ammonia is received, sprinkling water into the exhaust gas flow path is started. The ammonia flowing in the exhaust gas flow path is absorbed by the water. Therefore, also in this aspect, similarly to the gas turbine facility in the above aspect, it is possible to suppress the discharge of ammonia to the outside in a process of starting the supply of ammonia from the ammonia supply device to the combustor or in a process of stopping the supply of ammonia.

Advantageous Effects of Invention

In the aspect of the present disclosure, in a case where ammonia is used as a fuel for a gas turbine, it is possible to suppress discharge of ammonia to the outside.

DESCRIPTION OF EMBODIMENTS

Hereinafter, various embodiments and various modification examples of a gas turbine facility according to the present disclosure will be described using the drawings.

First Embodiment

Figure 2:
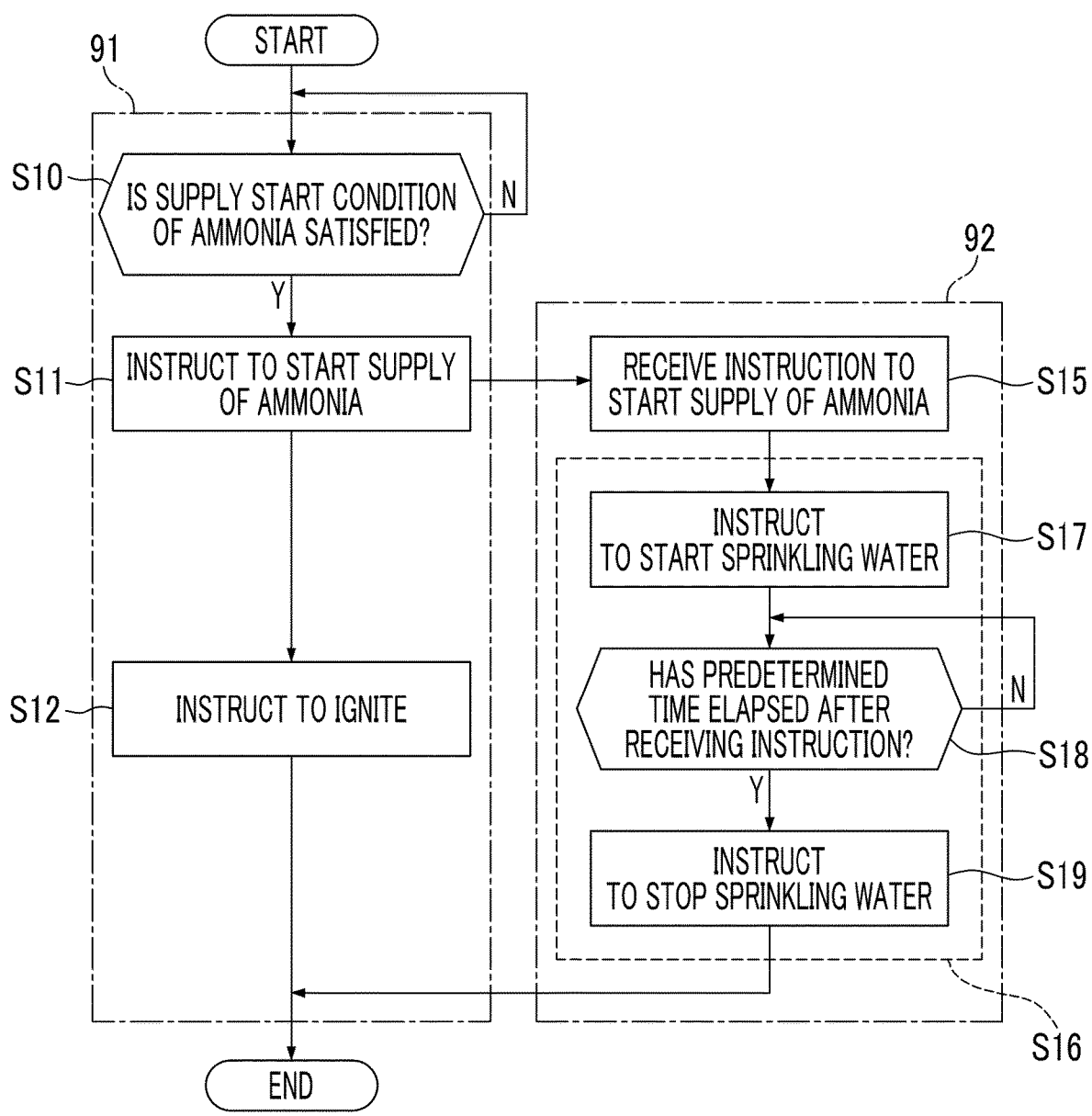
FIG. 2 is a flowchart showing an operation of a control device in a process of starting supply of ammonia in the embodiment of the present disclosure.
Figure 3:
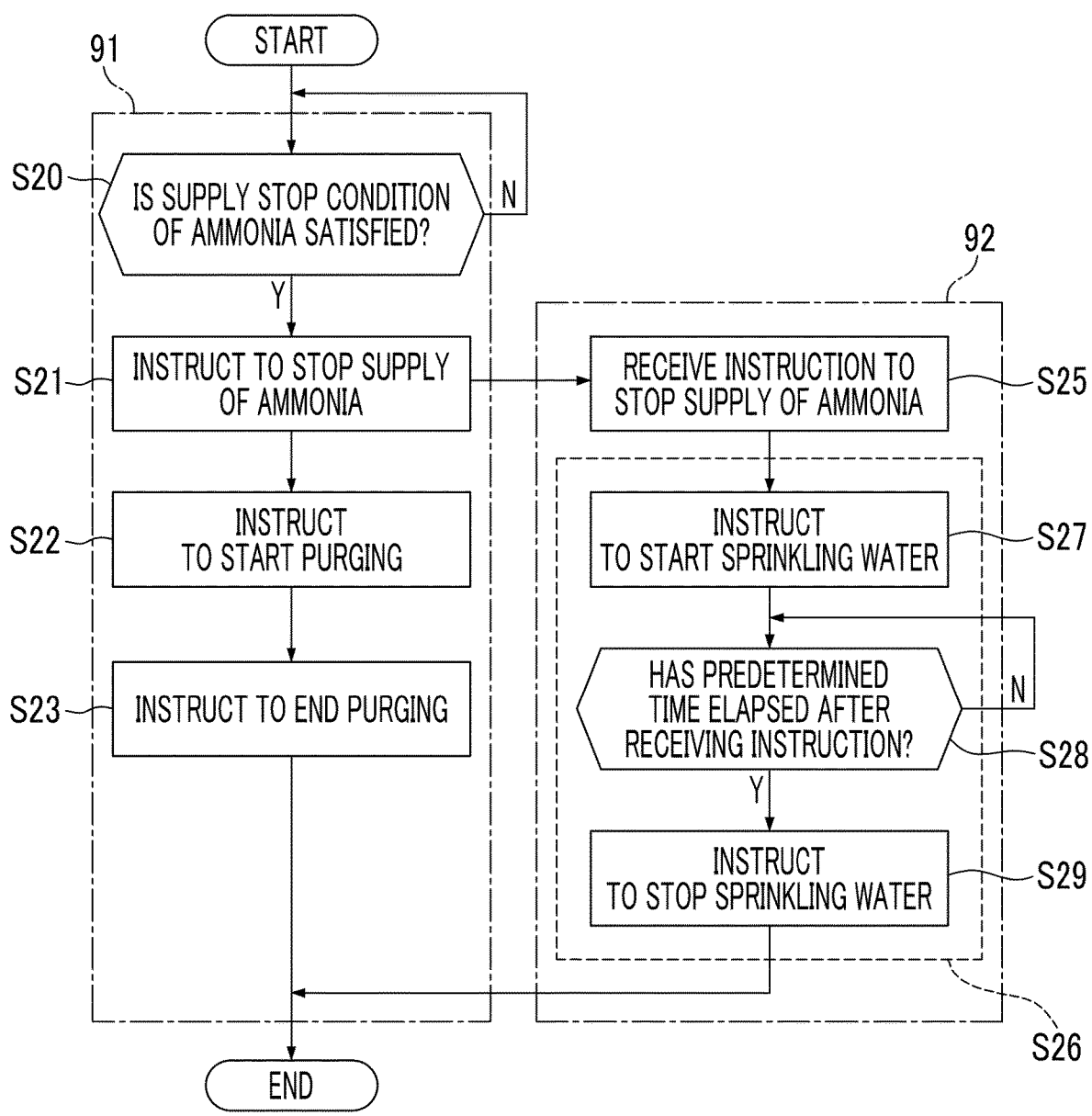
FIG. 3 is a flowchart showing an operation of the control device in a process of stopping the supply of ammonia in the embodiment of the present disclosure.

Hereinafter, a first embodiment of the gas turbine facility according to the present disclosure will be described using FIGS. 1 to 3.

Figure 1:
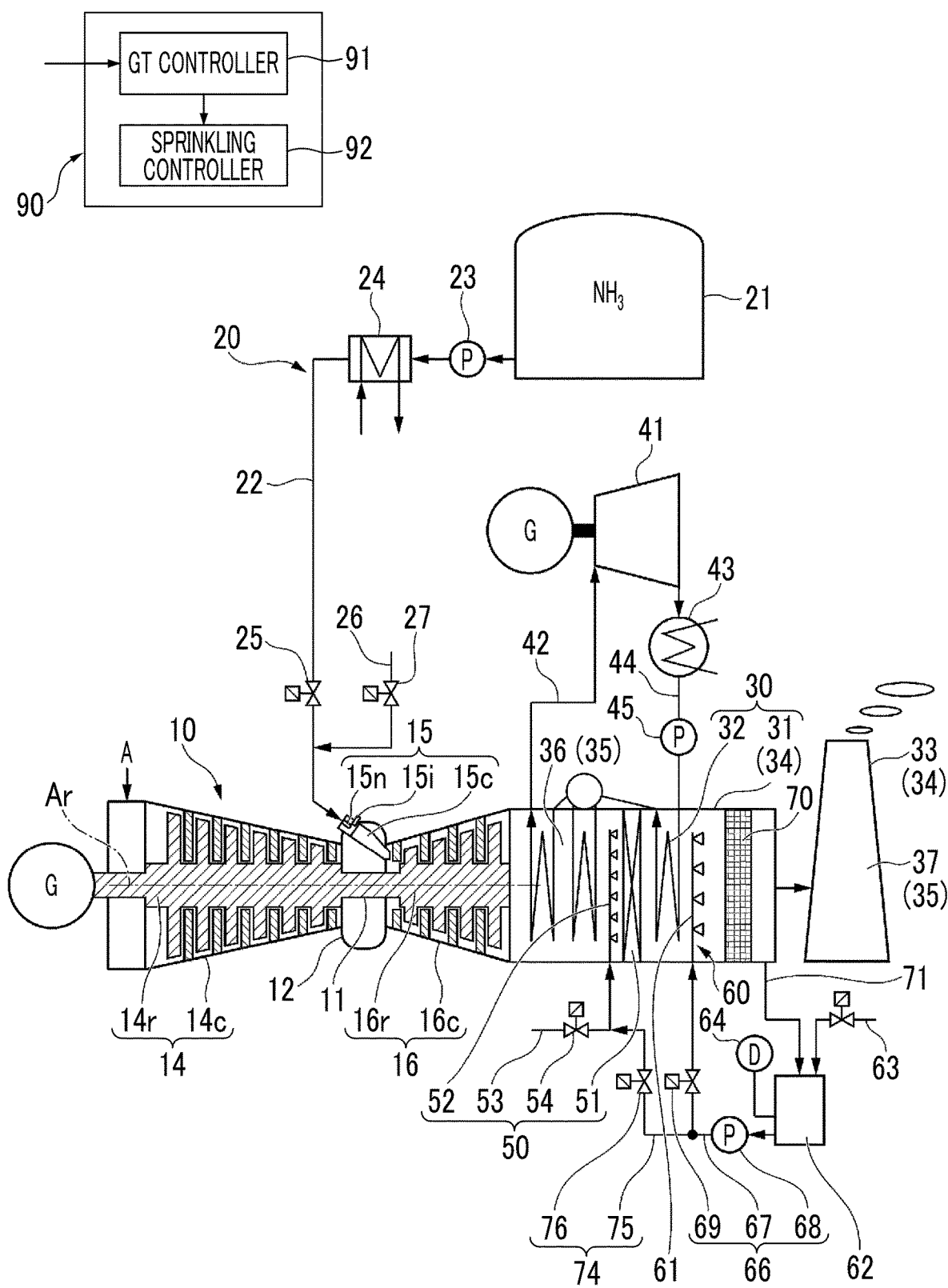
FIG. 1 is a system diagram of a gas turbine facility in a first embodiment according to the present disclosure.

As shown in FIG. 1, the gas turbine facility of the present embodiment includes a gas turbine 10, an ammonia supply device 20 that supplies ammonia as a fuel to the gas turbine 10, a heat recovery steam generator 30 that generates steam by using heat of exhaust gas exhausted from the gas turbine 10, a steam turbine 41 that is driven by the steam from the heat recovery steam generator 30, a condenser 43 that converts the steam from the steam turbine 41 back into water, a pump 45 that sends the water in the condenser 43 to the heat recovery steam generator 30, a stack 33 that exhausts the exhaust gas from the heat recovery steam generator 30 to the outside, a denitration apparatus 50 that decomposes NOx content contained in the exhaust gas from the gas turbine 10, a sprinkling device 60 that sprinkles water into the heat recovery steam generator 30, a mist eliminator 70, a water recovery line 71, an ammonia water supply device 74, and a control device 90.

The gas turbine 10 includes a compressor 14 that compresses air A, a combustor 15 that burns the fuel in the air compressed by the compressor 14 to generate a combustion gas, and a turbine 16 that is driven by the combustion gas having a high temperature and a high pressure.

The compressor 14 includes a compressor rotor 14r that rotates about a rotor axis Ar, and a compressor casing 14c that covers the compressor rotor 14r. The turbine 16 includes a turbine rotor 16r that rotates about the rotor axis Ar by means of the combustion gas from the combustor 15, and a turbine casing 16c that covers the turbine rotor 16r. The turbine rotor 16r and the compressor rotor 14r are connected to each other to be rotatable about the same rotor axis Ar and form a gas turbine rotor 11. For example, a rotor of a generator G is connected to the gas turbine rotor 11. The gas turbine 10 is a single-shaft gas turbine including one gas turbine rotor, but the gas turbine may be a two-shaft gas turbine or a three-shaft gas turbine.

The gas turbine 10 further includes an intermediate casing 12. The intermediate casing 12 is disposed between the compressor casing 14c and the turbine casing 16c in a direction in which the rotor axis Ar extends, and connects the compressor casing 14c and the turbine casing 16c. The compressed air discharged from the compressor 14 flows into the intermediate casing 12. The combustor 15 is fixed to the intermediate casing 12. The combustor 15 includes a combustion tube (or a transition piece) 15c, a fuel nozzle 15n that injects the fuel into the combustion tube 15c, and an ignition plug 15i that ignites the fuel injected into the combustion tube 15c.

The ammonia supply device 20 includes an ammonia tank 21, an ammonia line 22, an ammonia pump 23, a vaporizer 24, a fuel control valve 25, a purge gas line 26, and a purge gas control valve 27.

Liquid ammonia is stored in the ammonia tank 21. One end of the ammonia line 22 is connected to the ammonia tank 21, and the other end of the ammonia line 22 is connected to the fuel nozzle 15n of the combustor 15. The ammonia pump 23 is provided in the ammonia line 22. The ammonia pump 23 pressurizes the ammonia in the ammonia tank 21 and sends the ammonia to the combustor 15. The vaporizer 24 is provided at a position closer to the combustor 15 than the ammonia pump 23 is in the ammonia line 22. The vaporizer 24 is a heat exchanger that exchanges heat between a heating medium and the liquid ammonia to heat and vaporize the liquid ammonia. In addition, instead of the vaporizer 24, the ammonia supply device may include a sprayer that sprays liquid ammonia into a space to replace the liquid ammonia with mist ammonia. The fuel control valve 25 is provided at a position closer to the combustor 15 than the vaporizer 24 is in the ammonia line 22. The fuel control valve 25 controls a flow rate of ammonia as the fuel to be supplied to the combustor 15. One end of the purge gas line 26 is connected to a position closer to the combustor 15 than the fuel control valve 25 is in the ammonia line 22. A purge gas supply source (not shown) is connected to the other end of the purge gas line 26. The purge gas control valve 27 is provided in the purge gas line 26. The purge gas control valve 27 controls a flow rate of purge gas sent from the purge gas supply source to the ammonia line 22. The purge gas is, for example, nitrogen gas.

The heat recovery steam generator 30 exchanges heat between the exhaust gas exhausted from the gas turbine 10 and water, and heats the water to produce steam. The heat recovery steam generator 30 includes a duct 31 connected to the gas turbine 10 and a heat transfer tube 32 disposed in the duct 31. The duct 31 forms a duct gas flow path 36 through which the exhaust gas from the gas turbine 10 flows. Liquid or gaseous water flows through the heat transfer tube 32. A heat medium other than water may flow in the heat transfer tube 32.

One end of the heat transfer tube 32 in the heat recovery steam generator 30 and a steam inlet of the steam turbine 41 are connected to each other by a main steam line 42. The steam from the heat transfer tube 32 is sent to the steam turbine 41 via the main steam line 42. For example, a rotor of a generator is connected to a rotor of the steam turbine 41. The steam exhausted from the steam turbine 41 is converted back into water by the condenser 43. The other end of the heat transfer tube 32 in the heat recovery steam generator 30 and the condenser 43 are connected to each other by a supply water line 44. The supply water line 44 is provided with the pump 45 that sends the water in the condenser 43 to the heat recovery steam generator 30.

The stack 33 is connected to the duct 31 of the heat recovery steam generator 30. In the stack 33, a stack gas flow path 37 that exhausts the exhaust gas from the duct 31 to the outside is formed. The stack gas flow path 37 extends in a vertical direction. In the present embodiment, an exhaust gas flow path 35 through which the exhaust gas from the gas turbine 10 flows includes the duct gas flow path 36 and the stack gas flow path 37. Therefore, in the present embodiment, a flow path forming frame 34 forming the exhaust gas flow path 35 has the duct 31 of the heat recovery steam generator 30 and the stack 33.

The denitration apparatus 50 includes a catalyst layer 51 disposed in the duct 31 of the heat recovery steam generator 30, an ammonia sprayer 52 that sprays ammonia water on a side upstream of the catalyst layer 51 in a gas flow direction, an ammonia water supply line 53 that supplies ammonia water to the ammonia sprayer 52, and an ammonia water control valve 54. The ammonia water control valve 54 controls a flow rate of ammonia water flowing through the ammonia water supply line 53. The denitration apparatus 50 decomposes NOx contained in the exhaust gas from the gas turbine 10 into nitrogen and steam through an action of a catalyst by using ammonia water.

The sprinkling device 60 includes a sprinkler 61 capable of sprinkling water into the duct gas flow path 36, a water tank 62 capable of storing the water sprinkled by the sprinkler 61, and a water supply device 66 capable of supplying water in the water tank 62 to the sprinkler 61. The sprinkler 61 is disposed downstream of the denitration apparatus 50 and the heat transfer tube 32 in the gas flow in the duct 31. The mist eliminator 70 capable of capturing mist in the duct gas flow path 36 is disposed downstream of the sprinkler 61 in the gas flow direction in the duct 31. The mist eliminator 70 is formed of, for example, a net or a pad formed of a plurality of fibers. The water supply device 66 includes a water line 67 connecting the water tank 62 and the sprinkler 61, a water supply pump 68 provided in the water line 67, and a water control valve 69 provided in the water line 67 closer to the sprinkler 61 than the water supply pump 68 is.

One end of the water recovery line 71 is connected to, in the duct 31, a position downstream of the mist eliminator 70 in the gas flow direction or to a region where the mist eliminator 70 is disposed in the gas flow direction. The other end of the water recovery line 71 is connected to the water tank 62. That is, the water recovery line 71 is a line that returns the water sprinkled from the sprinkler 61 into the duct 31, to the water tank 62. The water tank 62 is provided with a makeup water supply line 63 capable of supplying water into the water tank 62. The water tank 62 is further provided with an ammonia concentration meter 64 capable of detecting an ammonia concentration in the water tank 62.

The ammonia water supply device 74 includes an ammonia water sub-line 75, an ammonia water sub-control valve 76, and the above-described water supply pump 68. The ammonia water sub-line 75 connects a position closer to the sprinkler 61 than the water supply pump 68 is and closer to the water tank 62 than the water control valve 69 is in the water line 67 of the sprinkling device 60, and a position closer to the ammonia sprayer 52 than the ammonia water control valve 54 is in the ammonia water supply line 53. The ammonia water sub-control valve 76 is provided in the ammonia water sub-line 75. The water supply pump 68 is one of components of the ammonia water supply device 74 and is also one of components of the sprinkling device 60.

The control device 90 includes a gas turbine controller 91 and a sprinkling controller 92. The gas turbine controller 91 controls operations and the like of the fuel control valve 25 and the purge gas control valve 27 according to various instruments provided in the gas turbine 10, an instruction from the outside, and the like. The sprinkling controller 92 controls an operation of the sprinkling device 60. The sprinkling controller 92 specifically controls operations of the water supply pump 68 and the water control valve 69. Each of the gas turbine controller 91 and the sprinkling controller 92 has a central processing unit (CPU) that executes various calculations, a memory that is a work area of the CPU, and the like. The gas turbine controller 91 and the sprinkling controller 92 may also be configured by a CPU shared with each other, a memory shared with each other, and the like.

Next, an operation of the gas turbine facility described above will be described.

When starting the gas turbine 10, a starter motor is driven to rotate the gas turbine rotor 11. There are cases where the starter motor is separately connected to the gas turbine rotor 11, or there are cases where the generator connected to the gas turbine rotor 11 serves as the starter motor. In addition, when starting the gas turbine 10, a diesel engine may be started to rotate the gas turbine rotor 11, or the gas turbine rotor 11 may be rotated by a steam turbine.

A rotation speed of the gas turbine rotor 11 is gradually increased by driving the starter motor. In this process, ammonia as the fuel is supplied to the combustor 15. Here, the operation of the control device 90 in a process of starting the supply of ammonia to the combustor 15 will be described with reference to a flowchart shown in FIG. 2.

The gas turbine controller 91 determines whether or not a supply start condition of ammonia as the fuel is satisfied in the process of starting the gas turbine 10 (S10: step of determining a supply start condition). When the rotation speed of the gas turbine rotor 11 reaches a predetermined rotation speed by driving the starter motor, the gas turbine controller 91 determines that the supply start condition of ammonia as the fuel is satisfied, and instructs the fuel control valve 25 and the sprinkling controller 92 to start the supply of ammonia (S11: step of instructing to start supply). Specifically, the gas turbine controller 91 instructs the fuel control valve 25 to be in an open state. Upon receiving this instruction, the fuel control valve 25 enters the open state. As a result, the supply of ammonia to the combustor 15 is started. Specifically, a portion in the ammonia line 22 closer to the combustor 15 than the fuel control valve 25 is and on an inside of the fuel nozzle 15*n* of the combustor 15 are filled with the ammonia, and the ammonia starts to be injected into the combustion tube 15*c* of the combustor 15.

After a predetermined time (for example, several minutes) has elapsed since the supply of ammonia to the combustor 15 was started, the gas turbine controller 91 causes the ignition plug 15*i* to ignite the ammonia in the combustion tube 15*c* (S12: step of instructing to ignite). As a result, the combustion of the ammonia in the combustion tube 15*c* is started.

As described above, the gas turbine controller 91 instructs not only the fuel control valve 25 but also the sprinkling controller 92 to start the supply of ammonia. Upon receiving this instruction (S15: step of receiving a supply start instruction), the sprinkling controller 92 instructs the sprinkling device 60 to start sprinkling water (S17: step of instructing to start sprinkling water). Specifically, the sprinkling controller 92 instructs the water supply pump 68 of the sprinkling device 60 to drive, and also instructs the water control valve 69 to be in an open state. As a result, the water in the water tank 62 starts to be supplied to the sprinkler 61 disposed in the duct 31 of the heat recovery steam generator 30 via the water line 67, and sprinkling the water is started in the duct gas flow path 36 (S16: sprinkling step).

The sprinkling controller 92 determines whether or not a predetermined time (for example, several minutes) has elapsed after receiving the instruction to start the supply of ammonia (S18: step of determining a sprinkling stop condition). An end time point of the predetermined time is later than a time point when the ignition of the ammonia is completed. In other words, the end time point of the predetermined time is a time point after a time point at which the unburned ammonia is expected to be no longer exhausted s turbine 10. When the sprinkling controller 92 determines that the predetermined time has elapsed after receiving the instruction to start the supply of ammonia, the sprinkling controller 92 instructs the sprinkling device 60 to stop sprinkling water (S19: step of instructing to stop sprinkling water). Specifically, the sprinkling controller 92 instructs the water supply pump 68 of the sprinkling device 60 to stop driving, and also instructs the water control valve 69 to be in a closed state. As a result, sprinkling of water from the sprinkler 61 into the duct gas flow path 36 is stopped, and the sprinkling step (S16) is ended.

During a period from the opening of the fuel control valve 25 to the ignition of ammonia in the combustion tube 15c, the ammonia flowing out from the fuel control valve 25 is exhausted from the gas turbine 10 without being burned. This ammonia flows in the duct gas flow path 36 inside the duct 31 of the heat recovery steam generator 30. In the present embodiment, the gas turbine controller 91 instructs the fuel control valve 25 to start the supply of ammonia (S11), and sprinkling water is started (S16). Therefore, in the process of starting the supply ammonia to the combustor 15, the ammonia exhausted from the gas turbine 10 is absorbed by water droplets from the sprinkler 61. The water droplets that have absorbed the ammonia are collected by the mist eliminator 70, are then accumulated in a lower portion of the duct 31, and return to the water tank 62 via the water recovery line 71. That is, a liquid containing water sprinkled in the duct gas flow path 36 that is a part of the exhaust gas flow path 35 is guided to the outside of the duct 31 that is a part of the flow path forming frame 34. A water recovery step of guiding water to the outside of the flow path forming frame 34 is performed in parallel with the sprinkling step.

When ammonia is ignited in the combustion tube 15c, the ammonia supplied to the combustor 15 continues to burn in the combustion tube 15c unless a misfire occurs. Therefore, when ammonia is ignited in the combustion tube 15c, the ammonia from the gas turbine 10 is not exhausted unless a misfire occurs. Therefore, in the present embodiment, after a predetermined time elapses after receiving the instruction to start the supply of ammonia and the ignition of the ammonia is completed, the sprinkling of water from the sprinkler 61 into the duct gas flow path 36 is stopped.

As described above, when the ammonia is ignited in the combustion tube 15c, the combustion of the ammonia is started. The combustion gas generated by the combustion is sent to the turbine 16 to rotate the turbine rotor. The combustion gas which has rotated the turbine rotor is exhausted from the gas turbine 10 as the exhaust gas and flows through the duct 31 of the heat recovery steam generator 30. In a case where ammonia is burned, NOx is contained in exhaust gas. Therefore, in the present embodiment, after the combustion of ammonia is started, the supply of ammonia water from an ammonia water supply source to the denitration apparatus 50 via the ammonia water supply line 53 is started, and NOx contained in the exhaust gas is decomposed into nitrogen and steam.

When the sprinkling step (S16) is repeatedly performed and water that has absorbed ammonia returns to the water tank 62 each time, the ammonia concentration in the water in the water tank 62 gradually increases. The ammonia concentration in the water tank 62 is detected by the ammonia concentration meter 64. Under a condition in which the ammonia concentration detected by the ammonia concentration meter 64 is equal to or higher than a predetermined concentration and a denitration treatment by the denitration apparatus 50 is required, the ammonia water sub-control valve 76 opens and water that has absorbed ammonia in the water tank 62 is supplied to the denitration apparatus 50 via the ammonia water sub-line 75. The denitration apparatus 50 decomposes NOx contained in the exhaust gas into nitrogen and steam by using the ammonia water. Therefore, in the present embodiment, the amount of ammonia water used from the ammonia water supply source used for the denitration treatment can be reduced.

Next, the operation of the control device 90 in a process of stopping the supply ammonia to the combustor 15 will be described with reference to a flowchart shown in FIG. 3.

The gas turbine controller 91 determines whether or not a supply stop condition of ammonia as the fuel is satisfied while the ammonia is being supplied to the combustor 15 (S20: step of determining a supply stop condition).

Here, cases where the supply stop condition of ammonia is satisfied include
  a. a case where a normal stop of the gas turbine 10 is received from the outside, and
  b. a case where it becomes necessary to urgently stop the gas turbine 10 due to an instruction from the outside or signals from various sensors provided in the gas turbine 10 due to some trouble.

The case where it becomes necessary to urgently stop the gas turbine 10 means, specifically, a case where a misfire of ammonia occurs in the combustion tube 15c, a case where an emergency shutoff between the generator connected to the gas turbine 10 and an external power system is received from the outside, or the like.

When the gas turbine controller 91 determines that the supply stop condition of ammonia is satisfied, the gas turbine controller 91 instructs the fuel control valve 25 and the sprinkling controller 92 to stop the supply of ammonia (S21: step of instructing to stop supply). Specifically, the gas turbine controller 91 instructs the fuel control valve 25 to be in a closed state. Upon receiving this instruction, the fuel control valve 25 enters the closed state. As a result, the supply of ammonia to the combustor 15 is stopped. Furthermore, the gas turbine controller 91 instructs the purge gas control valve 27 to be in an open state (S22: step of instructing to start purging). Upon receiving this instruction, the purge gas control valve 27 enters the open state. As a result, the purge gas such as nitrogen is sent from the purge gas supply source to the ammonia line 22. By the purge gas, ammonia in the portion in the ammonia line 22 closer to the combustor 15 than the fuel control valve 25 is and on the inside of the fuel nozzle 15n of the combustor 15 is pushed into the combustion tube 15c.

After a predetermined time (for example, several minutes) has elapsed since the supply of ammonia to the combustor 15 was stopped, the gas turbine controller 91 instructs the purge gas control valve 27 to be in a closed state (S23: step of instructing to end purging). An end time point of the predetermined time is a time point at which the supply of ammonia to the combustor 15 is stopped, the rotation speed of the gas turbine rotor 11 gradually decreases, and a superficial velocity of the gas in the turbine casing becomes equal to or slower than a predetermined velocity. In other words, the end time point of the predetermined time is a time point after a time point at which the unburned ammonia is expected to be substantially no longer exhausted from the gas turbine 10. Upon receiving this instruction, the purge gas control valve 27 enters the closed state, and the purge gas is not sent from the purge gas supply source to the ammonia line 22.

As described above, the gas turbine controller 91 instructs not only the fuel control valve 25 but also the sprinkling controller 92 to stop the supply of ammonia. Upon receiving this instruction (S25: step of receiving a supply stop instruction), the sprinkling controller 92 instructs the sprinkling device 60 to start sprinkling water (S27: step of instructing to start sprinkling water). Specifically, the sprinkling controller 92 instructs the water supply pump 68 of the sprinkling device 60 to drive, and also instructs the water control valve 69 to be in the open state. As a result, the water in the water tank 62 starts to be supplied to the sprinkler 61 disposed in the duct 31 of the heat recovery steam generator 30 via the water line 67, and sprinkling the water is started in the duct gas flow path 36 (S26: sprinkling step).

The sprinkling controller 92 determines whether or not a predetermined time (for example, several minutes) has elapsed after receiving the instruction to start the supply of ammonia (S28: step of determining a sprinkling stop condition). An end time point of the predetermined time is later than a time point when the purge gas control valve 27 enters the closed state. When the sprinkling controller 92 determines that a predetermined time has elapsed after receiving the instruction to stop the supply of ammonia, the sprinkling controller 92 instructs the sprinkling device 60 to stop sprinkling water (S29: step of instructing to stop sprinkling water). Specifically, the sprinkling controller 92 instructs the water supply pump 68 of the sprinkling device 60 to stop driving, and also instructs the water control valve 69 to be in the closed state. As a result, sprinkling of water from the sprinkler 61 into the duct gas flow path 36 is stopped, and the sprinkling step (S26) is ended.

As described above, after the fuel control valve 25 enters the closed state, by the purge gas, ammonia in the portion in the ammonia line 22 closer to the combustor 15 than the fuel control valve 25 is and on the inside of the fuel nozzle 15*n* of the combustor 15 is pushed into the combustion tube 15*c*. The ammonia is exhausted from the gas turbine 10 without being burned. This ammonia flows in the duct gas flow path 36 inside the duct 31 of the heat recovery steam generator 30. In the present embodiment, as described above, the gas turbine controller 91 instructs the fuel control valve 25 to stop the supply of ammonia (S21), and sprinkling water is started (S26). Therefore, in the process of stopping the supply of ammonia to the combustor 15, the ammonia exhausted from the gas turbine 10 is absorbed by water droplets from the sprinkler 61. The water droplets that have absorbed the ammonia are collected by the mist eliminator 70, are then accumulated in the lower portion of the duct 31, and return to the water tank 62 via the water recovery line 71.

A time point when the purge gas control valve 27 enters the closed state is a time point when the gas is hardly exhausted from the turbine casing, as described above. Therefore, in the present embodiment, after a predetermined time has elapsed after receiving the instruction to stop the supply of ammonia and the purge control valve enters the closed state, sprinkling water from the sprinkler 61 into the duct gas flow path 36 is stopped.

As described above, in the process of starting the supply of ammonia to the combustor 15 and the process of stopping the supply of ammonia to the combustor 15, unburned ammonia is exhausted from the gas turbine 10. In the present embodiment, when unburned ammonia is exhausted from the gas turbine 10 in these processes, water is sprinkled into the duct gas flow path 36 by the sprinkling device 60, and the ammonia is absorbed by the water. Therefore, in the present embodiment, the discharge of ammonia to the outside can be suppressed.

Second Embodiment

Hereinafter, a second embodiment of the gas turbine facility according to the present disclosure will be described using FIGS. 4 and 5.

Figure 4:
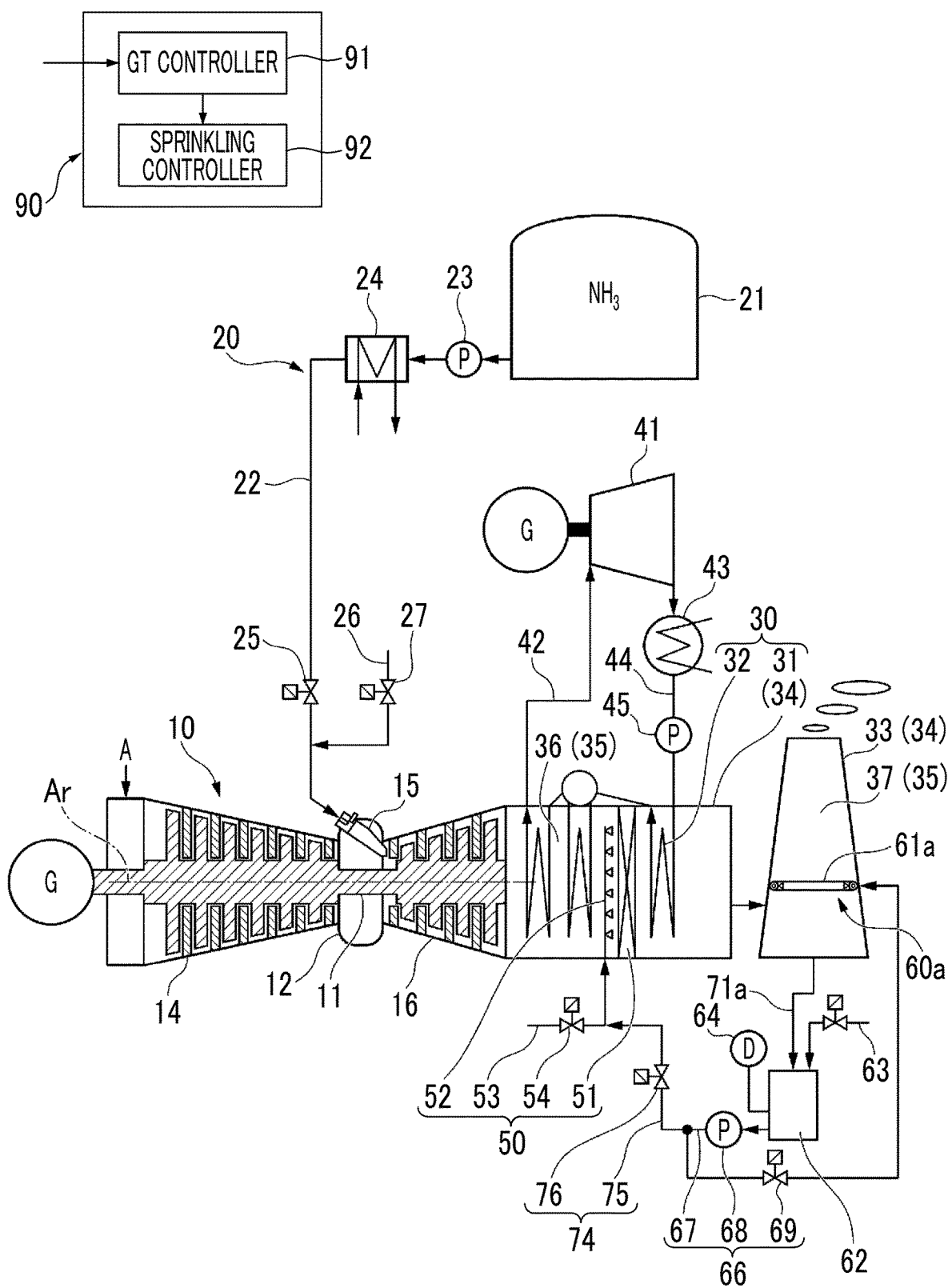
FIG. 4 is a system diagram of a gas turbine facility in a second embodiment according to the present disclosure.
Figure 5:
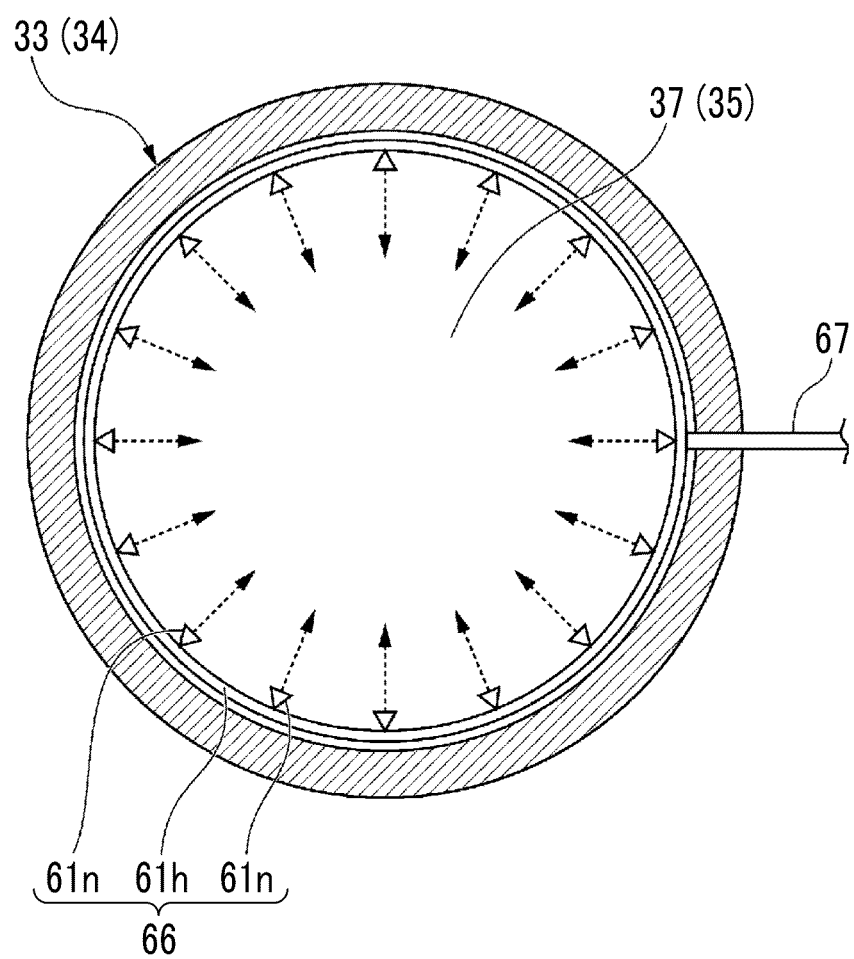
FIG. 5 is a cross-sectional view of a stack in the second embodiment according to the present disclosure.

Similar to the gas turbine facility of the first embodiment, as shown in FIG. 4, the gas turbine facility of the present embodiment includes the gas turbine 10, the ammonia supply device 20, the heat recovery steam generator 30, the steam turbine 41, the condenser 43, the pump 45, the stack 33, the denitration apparatus 50, a sprinkling device 60*a*, a water recovery line 71*a*, the ammonia water supply device 74, and the control device 90. However, the sprinkling device 60*a* of the present embodiment is different from the sprinkling device 60 of the first embodiment. Due to this relationship, the water recovery line 71*a* of the present embodiment is also different from the water recovery line 71 of the first embodiment. In addition, the gas turbine facility of the present embodiment does not include the mist eliminator 70 in the gas turbine facility of the first embodiment.

Similar to the sprinkling device 60 of the first embodiment, the sprinkling device 60*a* of the present embodiment includes a sprinkler 61*a*, the water tank 62, and the water supply device 66. However, the sprinkler 61*a* of the present embodiment is different from the sprinkler 61 of the first embodiment in disposition and configuration. The sprinkler 61*a* of the present embodiment is disposed not in the duct 31 of the heat recovery steam generator 30, but in the stack 33, in other words, in the stack gas flow path 37. As shown in FIG. 5, the sprinkler 61*a* has an annular ring header 61*h* along an inner peripheral surface of the stack 33, and a plurality of nozzles 61*n* provided on an inner peripheral side of the ring header 61*h*. The ring header 61*h* is connected to the water line 67 extending from the water tank 62 (see FIG. 4). The plurality of nozzles 61*n* are provided so that water supplied to the ring header 61*h* can be sprinkled toward the inner peripheral side of the annular ring header 61*h* in a direction having a horizontal component.

As shown in FIG. 4, one end of the water recovery line 71*a* is connected to a position below a position where the sprinkler 61*a* is disposed in the stack 33. In addition, the other end of the water recovery line 71*a* is connected to the water tank 62 like the other end of the water recovery line 71 of the first embodiment.

The control device 90 of the present embodiment has the same configuration as the control device 90 of the first embodiment, and includes the gas turbine controller 91 and the sprinkling controller 92. In addition, the control device 90 of the present embodiment operates in the same manner as the control device 90 of the first embodiment. Therefore, in the process of starting the supply of ammonia to the combustor 15, the gas turbine controller 91 and the sprinkling controller 92 perform the operations shown in the flowchart of FIG. 2. In addition, in the process of stopping the supply of ammonia to the combustor 15, the gas turbine controller 91 and the sprinkling controller 92 perform the operations shown in the flowchart of FIG. 3.

Also in the present embodiment, as in the first embodiment, when unburned ammonia is exhausted from the gas turbine 10 in the process of starting the supply of ammonia to the combustor 15 and the process of stopping the supply of ammonia to the combustor 15, water is sprayed into the stack gas flow path 37 by the sprinkling device 60a and absorbs the ammonia. Therefore, also in the present embodiment, it is possible to suppress the exhaust of ammonia to the outside.

Meanwhile, in the present embodiment, a particle size of the water droplets sprinkled from the sprinkler 61a is set to a particle size having a settling speed equal to or faster than an ascending speed of the exhaust gas flowing in the stack 33 so that the water droplets sprinkled from the sprinkler 61a are not discharged to the outside of the stack 33. Therefore, in the present embodiment, the water droplets do not substantially flow to a downstream side (upper side) in the gas flow direction from the sprinkler 61a, and unlike in the first embodiment, there is no need to dispose the mist eliminator 70 downstream of the sprinkler 61 in the gas flow direction. Therefore, in the present embodiment, a pressure loss in the exhaust gas flow path 35 can be suppressed compared to the first embodiment. However, since the particle size of the water droplets of the present embodiment needs to be larger than a particle size of the water droplets of the first embodiment, an ammonia absorption efficiency is lower than that of the first embodiment.

That is, the present embodiment has an advantage in that the pressure loss in the exhaust gas flow path 35 can be suppressed compared to the first embodiment, but has a disadvantage in that the ammonia absorption efficiency is lower than that of the first embodiment. In other words, the first embodiment has an advantage in that the ammonia absorption efficiency is higher than that of the present embodiment, but has a disadvantage in that the pressure loss in the exhaust gas flow path 35 is higher than that of the present embodiment. Therefore, it is preferable to determine which one of the sprinkler 61 of the first embodiment and the sprinkler 61a of the present embodiment is to be adopted by comparing the advantages and the disadvantages of the two.

The present embodiment is an example in which the sprinkler 61a is provided in the stack 33 and a mist eliminator is not provided downstream (on an upper side) of the sprinkler 61a. However, the sprinkler 61a may be provided in the stack 33, and a mist eliminator may be provided downstream (on the upper side) of the sprinkler 61a.

Third Embodiment

Hereinafter, a third embodiment of the gas turbine facility according to the present disclosure will be described using FIG. 6.

Figure 6:
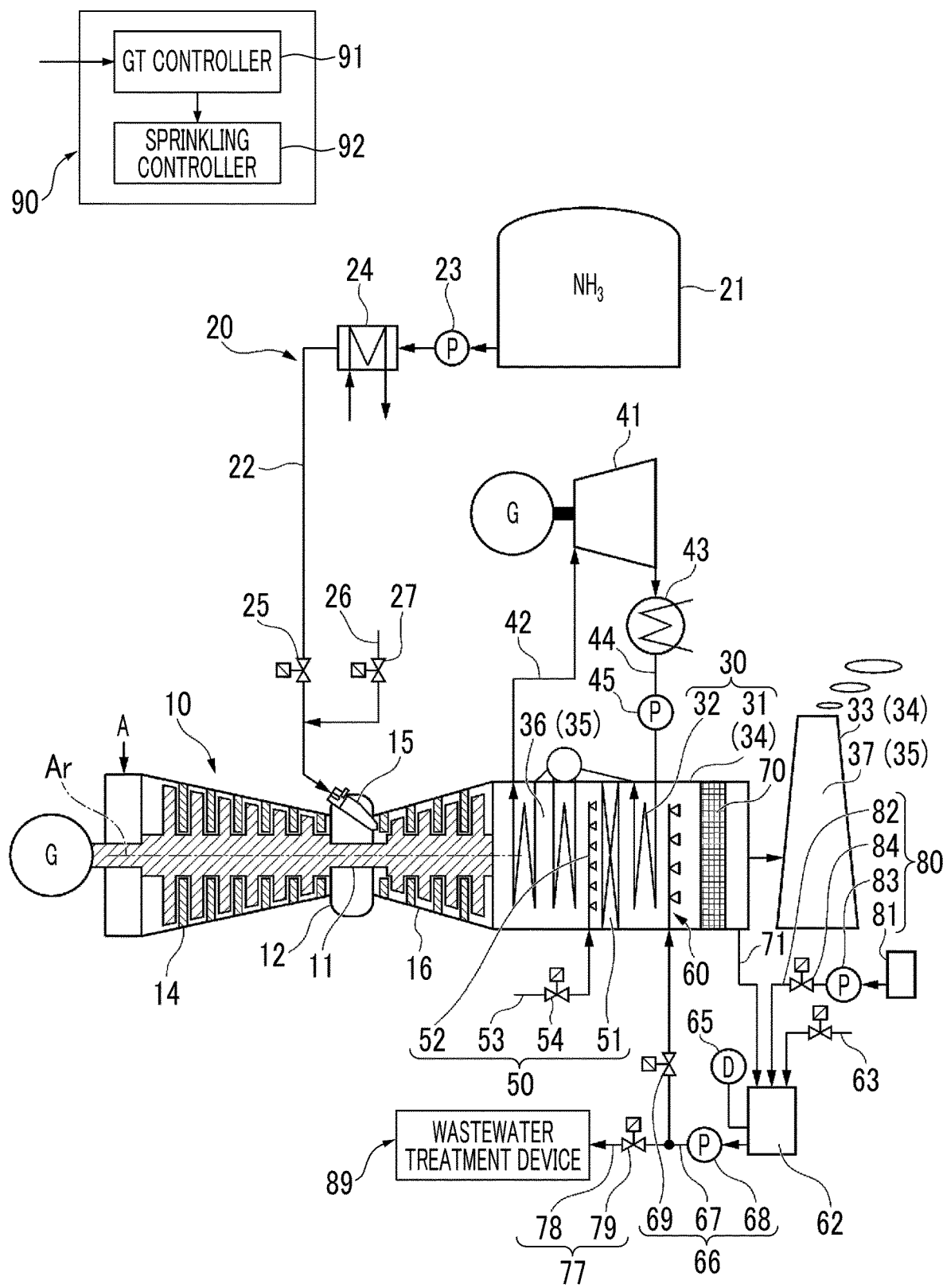
FIG. 6 is a system diagram of a gas turbine facility in a third embodiment according to the present disclosure.

Similar to the gas turbine facility of the first embodiment, as shown in FIG. 6, the gas turbine facility of the present embodiment includes the gas turbine 10, the ammonia supply device 20, the heat recovery steam generator 30, the steam turbine 41, the condenser 43, the pump 45, the stack 33, the denitration apparatus 50, the sprinkling device 60, the water recovery line 71, and the control device 90. However, the gas turbine facility of the present embodiment does not include the ammonia water supply device 74 in the gas turbine facility of the first embodiment. The gas turbine facility of the present embodiment includes a treated water supply device 77 instead of the ammonia water supply device 74. Furthermore, the gas turbine facility of the present embodiment includes an acid supply device 80.

The acid supply device 80 includes an acid tank 81 capable of accumulating an aqueous solution of an acid which produces a salt via reaction with ammonia, an acid line 82 connecting the acid tank 81 and the water tank 62, and an acid supply pump 83 and an acid control valve 84 provided in the acid line 82. Examples of the aqueous solution of the acid which produces the salt via reaction with ammonia include a hydrochloric acid aqueous solution and a sulfuric acid aqueous solution. In addition, the salt produced by the reaction between ammonia and the hydrochloric acid aqueous solution is ammonium chloride, and the salt produced by the reaction between ammonia and the sulfuric acid aqueous solution is ammonium sulfate. Similar to the first embodiment, the water recovery line 71 and the makeup water supply line 63 are also connected to the water tank 62. The water tank 62 is provided with a salt amount detector 65 capable of detecting the amount of salt in the water tank 62 instead of the ammonia concentration meter 64 in the first embodiment. The salt amount detector 65 may, for example, detect the concentration of the salt in the water tank 62, but may indirectly detect the amount of the salt in the water tank 62 by detecting a pH of the water in the water tank 62.

The treated water supply device 77 can guide the water in the water tank 62 to a wastewater treatment device 89. The treated water supply device 77 includes a treated water line 78, a treated water control valve 79, and the water supply pump 68 of the sprinkling device 60. The treated water line 78 connects a position closer to the sprinkler 61 than the water supply pump 68 is and closer to the water tank 62 than the water control valve 69 is in the water line 67 of the sprinkling device 60, to the wastewater treatment device 89. The treated water control valve 79 is provided in the treated water line 78. The water supply pump 68 is one of components of the treated water supply device 77 and is also one of the components of the sprinkling device 60.

The control device 90 of the present embodiment has the same configuration as the control device 90 of the first embodiment, and includes the gas turbine controller 91 and the sprinkling controller 92. In addition, the control device 90 of the present embodiment operates in the same manner as the control device 90 of the first embodiment. Therefore, in the process of starting the supply of ammonia to the combustor 15, the gas turbine controller 91 and the sprinkling controller 92 perform the operations shown in the flowchart of FIG. 2. In addition, in the process of stopping the supply of ammonia to the combustor 15, the gas turbine controller 91 and the sprinkling controller 92 perform the operations shown in the flowchart of FIG. 3.

In the present embodiment, the acid is charged into the water supplied to the sprinkler 61. Therefore, the water sprinkled from the sprinkler 61 becomes weakly acidic. Therefore, in the present embodiment, the ammonia absorption efficiency in the exhaust gas flow path 35 can be increased. The water that has absorbed ammonia contains the salt produced by the reaction between ammonia and the acid. The water containing the ammonia and the salt is accumulated in the lower portion of the duct 31, and returns to the water tank 62 via the water recovery line 71. The salt amount detector 65 detects the amount of the salt in the water in the water tank 62. When the amount of the salt detected by the salt amount detector 65 becomes equal to or more than a predetermined value, the water supply pump 68 is driven, the treated water control valve 79 opens, and the water containing the salt is sent to the wastewater treatment device 89 via the treated water line 78. Thereafter, water is supplied into the water tank 62 from the makeup water supply line 63, and the aqueous solution of the acid is supplied from the acid supply device 80 into the water tank 62.

The present embodiment is a modification example of the first embodiment, and the second embodiment may also be modified as in the present embodiment. That is, also in the second embodiment, the treated water supply device 77 may be provided instead of the ammonia water supply device 74 in the gas turbine facility of the second embodiment, and the acid supply device 80 may be further provided.

The embodiments and modification examples of the present disclosure have been described in detail above. However, the present disclosure is not limited to the above-described embodiments and modification examples. Various additions, changes, replacements, or partial deletions can be made within the scope that does not deviate from the conceptual idea and the gist of the present disclosure derived from the contents defined in the scope of the appended claims and the equivalent thereof.

APPENDIX

The gas turbine facility in each of the embodiments described above is understood as follows, for example.

(1) A gas turbine facility in a first aspect includes:
  a gas turbine 10 having a combustor 15; an ammonia supply device 20 that supplies ammonia to the combustor 15; a flow path forming frame 34 forming an exhaust gas flow path 35 through which exhaust gas from the gas turbine 10 flows; a sprinkling device 60, 60a that is disposed in the exhaust gas flow path 35 and that has a sprinkler 61, 61a capable of sprinkling water into the exhaust gas flow path 35; and a sprinkling controller 92 that controls an operation of the sprinkling device 60, 60a. The sprinkling controller 92 instructs the sprinkling device 60, 60a to start sprinkling the water on condition that an instruction to start supply of the ammonia to the combustor 15 from the ammonia supply device 20 or an instruction to stop the supply of the ammonia is received.

The ammonia supply device 20 generally includes an ammonia line 22 through which ammonia as a fuel flows, and a fuel control valve 25 provided in the ammonia line 22. In a process of starting the supply of ammonia from the ammonia supply device 20 to the combustor 15, a portion in the ammonia line 22 closer to the combustor 15 than the fuel control valve 25 is and on an inside of the fuel nozzle 15n of the combustor 15 are filled with the ammonia, and the ammonia starts to be injected into a combustion tube 15c of the combustor 15. Thereafter, the ammonia in the combustion tube 15c is ignited. During a period between when the fuel control valve 25 receives the instruction to start the supply of ammonia and the fuel control valve 25 opens and when the ammonia in the combustion tube 15c is ignited, ammonia that flows out from the fuel control valve 25 is exhausted from the gas turbine 10 without being burned. This ammonia flows in the exhaust gas flow path 35. In addition, in a process of stopping the supply of ammonia to the combustor 15, after the fuel control valve 25 receives the instruction to stop the supply of ammonia and the fuel control valve 25 is closed, ammonia in the portion in the ammonia line 22 closer to the combustor 15 than the fuel control valve 25 is and on the inside of the fuel nozzle 15n of the combustor 15 flows out into the combustion tube 15c. This ammonia is also exhausted from the gas turbine 10 without being burned.

Upon receiving the instruction to start the supply of ammonia or to stop the supply of ammonia, the sprinkling controller 92 in this aspect instructs the sprinkling device 60, 60a to start sprinkling water. As a result, sprinkling water from the sprinkler 61, 61a into the exhaust gas flow path 35 is started, and the ammonia flowing in the exhaust gas flow path 35 is absorbed by the water.

Therefore, in this aspect, it is possible to suppress the discharge of ammonia to the outside in the process of starting the supply of ammonia from the ammonia supply device 20 to the combustor 15 or in the process of stopping the supply of ammonia.

(2) In a gas turbine facility in a second aspect,
  in the gas turbine facility in the first aspect, the sprinkling controller 92 instructs the sprinkling device 60, 60a to stop sprinkling water after a predetermined time has elapsed after receiving the instruction to start the supply of ammonia or the instruction to stop the supply of ammonia. An end time point of the predetermined time is a time point after a time point at which unburned ammonia is expected to be no longer exhausted from the gas turbine 10.

In this aspect, during a period between when the unburned ammonia starts to be exhausted from the gas turbine 10 to the time point at which unburned ammonia is expected to be no longer exhausted from the gas turbine 10, water is sprinkled into the exhaust gas flow path 35 by the sprinkling device 60, 60a, and the ammonia in the exhaust gas flow path 35 is absorbed by the water. Then, after the time point at which the unburned ammonia is expected to be no longer exhausted from the gas turbine 10, the sprinkling of water from the sprinkling device 60, 60a into the exhaust gas flow path 35 is stopped. Therefore, in this aspect, a driving time of the sprinkling device 60, 60a can be limited, and a driving power of the sprinkling device 60, 60a and a consumption amount of the water to be sprinkled can be reduced.

(3) In a gas turbine facility in a third aspect,
  the gas turbine facility in the first aspect or the second aspect further includes a water recovery line 71, 71a that guides a liquid including the water sprinkled into the exhaust gas flow path 35 to an outside of the flow path forming frame 34.

The water that has been sprinkled into the exhaust gas flow path 35 from the sprinkler 61, 61a and that has absorbed ammonia is accumulated in the exhaust gas flow path 35. In this aspect, the water is guided to the outside of the flow path forming frame 34 by the water recovery line 71, 71a.

(4) In a gas turbine facility in a fourth aspect,
  the gas turbine facility in the third aspect further includes a mist eliminator 70 that collects mist. The flow path forming frame 34 has a duct 31 connected to the gas turbine 10. A duct gas flow path 36 forming at least a part of the exhaust gas flow path 35 is formed in the duct 31. The sprinkler 61 is disposed in the duct gas flow path 36 and is configured to sprinkle the water toward a downstream side of a flow of the exhaust gas in the duct gas flow path 36. The mist eliminator 70 is disposed downstream of the sprinkler 61 in the duct gas flow path 36. The water recovery line 71 is connected to, in the duct 31, a position downstream of the mist eliminator 70 in a flow direction of the exhaust gas or to a region where the mist eliminator 70 is disposed in the flow direction of the exhaust gas.

In this aspect, the ammonia flowing in the duct gas flow path 36 is absorbed by water droplets sprinkled from the sprinkler 61 disposed in the duct gas flow path 36. The water droplets that have absorbed the ammonia and flowed to the downstream side in the duct gas flow path 36 are collected by the mist eliminator 70. The water droplets collected by the mist eliminator 70 are accumulated in the duct 31. The water accumulated in the duct 31 is guided to the outside of the duct 31 by the water recovery line 71.

(5) In a gas turbine facility in a fifth aspect,
in the gas turbine facility in the third aspect, the flow path forming frame 34 includes a duct 31 connected to the gas turbine 10 and a stack 33 connected to the duct 31. A stack gas flow path 37 that forms at least a part of the exhaust gas flow path 35 and that extends in a vertical direction is formed in the stack 33. The sprinkler 61a is disposed in the stack gas flow path 37 and is configured to sprinkle the water in a direction having a horizontal component. The water recovery line 71a is connected to a position below a position where the sprinkler 61a is disposed in the stack 33.

In this aspect, the ammonia flowing in the stack gas flow path 37 is absorbed by the water droplets sprinkled from the sprinkler 61, 61a disposed in the stack gas flow path 37. The water droplets that have absorbed the ammonia are accumulated in the stack 33. This water is guided to the outside of the stack 33 by the water recovery line 71a.

(6) In a gas turbine facility in a sixth aspect,
in the gas turbine facility in any one of the third to fifth aspects, the sprinkling device 60, 60a includes a water tank 62 that stores the water to be sprinkled in the exhaust gas flow path 35, and a water supply device 66 that supplies the water in the water tank 62 to the sprinkler 61, 61a. The sprinkling controller 92 controls the water supply device 66.

(7) In a gas turbine facility in a seventh aspect,
the gas turbine facility in the sixth aspect further includes: a denitration apparatus 50 that is disposed upstream of the sprinkler 61, 61a in a flow direction of the exhaust gas in the exhaust gas flow path 35 and that removes a nitrogen oxide in the exhaust gas; and an ammonia water supply device 74 that supplies the water in the water tank 62 to the denitration apparatus 50. The water recovery line 71, 71a is connected to the water tank 62. The water tank 62 is provided with an ammonia concentration meter 64 capable of detecting an ammonia concentration in the water tank 62. The ammonia water supply device 74 supplies the water in the water tank 62 to the denitration apparatus 50 when the ammonia concentration detected by the ammonia concentration meter 64 becomes equal to or higher than a predetermined concentration.

When the sprinkling of water into the exhaust gas flow path 35 is repeatedly performed and water that has absorbed ammonia returns to the water tank 62 each time, the ammonia concentration in the water in the water tank 62 gradually increases. The ammonia concentration in the water in the water tank 62 is detected by the ammonia concentration meter 64. Under a condition in which the ammonia concentration detected by the ammonia concentration meter 64 is equal to or higher than a predetermined concentration and a denitration treatment by the denitration apparatus 50 is required, the water containing ammonia in the water tank 62 is supplied to the denitration apparatus 50 by the ammonia water supply device 74. The denitration apparatus 50 decomposes NOx contained in the exhaust gas into nitrogen and steam by using the ammonia water. Therefore, in the present embodiment, the amount of ammonia water used from the ammonia water supply source used for the denitration treatment can be reduced.

(8) In a gas turbine facility in an eighth aspect,
the gas turbine facility according to the sixth aspect further includes: an acid supply device 80 that supplies an acid which produces a salt via reaction with the ammonia into the water tank 62; and a treated water supply device 77 that guides the water in the water tank 62 to a wastewater treatment device 89. The water recovery line 71, 71a is connected to the water tank 62. The water tank 62 is provided with a salt amount detector 65 capable of detecting an amount of the salt in the water tank 62. The treated water supply device 77 guides the water in the water tank 62 to the wastewater treatment device 89 when the amount of the salt detected by the salt amount detector 65 becomes equal to or more than a predetermined amount.

When the acid from the acid supply device 80 is supplied to the water supplied to the sprinkler 61, 61a, the water sprinkled from the sprinkler 61, 61a becomes weakly acidic. Therefore, in this aspect, an ammonia absorption efficiency in the exhaust gas flow path 35 can be increased. The water that has absorbed ammonia contains the salt produced by the reaction between ammonia and the acid. The water containing the ammonia and the salt returns to the water tank 62 via the water recovery line 71, 71a. The salt amount detector 65 detects the amount of the salt in the water in the water tank 62. When the amount of the salt detected by the salt amount detector 65 becomes equal to or more than the predetermined value, the water containing the salt is sent to the wastewater treatment device 89 by the treated water supply device 77.

A method for suppressing discharge of ammonia from a gas turbine facility in each of the embodiments described above is understood as follows, for example.

(9) A method for suppressing discharge of ammonia from a gas turbine facility in a ninth aspect is applied to the following gas turbine facility.

The gas turbine facility includes a gas turbine 10 having a combustor 15, an ammonia supply device 20 that supplies ammonia to the combustor 15, and a flow path forming frame 34 forming an exhaust gas flow path 35 through which exhaust gas from the gas turbine 10 flows.

In the method for suppressing discharge of ammonia in this aspect, a sprinkling step S16 of sprinkling water into the exhaust gas flow path 35 is performed. In the sprinkling step S16, sprinkling the water into the exhaust flow 35 gas path is started on condition that an instruction to start supply of the ammonia to the combustor 15 from the ammonia supply device 20 or an instruction to stop the supply of the ammonia is received.

In this aspect, similarly to the gas turbine facility in the first aspect, when the instruction to start supply of ammonia or to stop supply of ammonia is received, sprinkling water into the exhaust gas flow path 35 is started. The ammonia flowing in the exhaust gas flow path 35 is absorbed by the water. Therefore, also in this aspect, similarly to the gas turbine facility in the first aspect, it is possible to suppress the discharge of ammonia to the outside in a process of starting the supply of ammonia from the ammonia supply device 20 to the combustor 15 or in a process of stopping the supply of ammonia.

(10) In a method for suppressing discharge of ammonia from a gas turbine facility in a tenth aspect,
in the method for suppressing discharge of ammonia from a gas turbine facility in the ninth aspect, in the sprinkling step S16, after a predetermined time has elapsed after receiving the instruction to start the supply of the ammonia or the instruction to stop the supply of the ammonia, sprinkling the water into the exhaust gas flow path 35 is stopped. An end time point of the predetermined time is a time point after a time point at which unburned ammonia is expected to be no longer exhausted from the gas turbine 10.

In this aspect, similarly to the gas turbine facility in the second aspect, a time for which the sprinkling step S16 is performed can be limited, and an electric power required to perform the sprinkling step S16 and a consumption amount of the water to be sprinkled can be reduced.

INDUSTRIAL APPLICABILITY

According to one aspect of the present disclosure, in a case where ammonia is used as a fuel for a gas turbine, it is possible to suppress discharge of ammonia to the outside.

REFERENCE SIGNS LIST

10: Gas turbine
11: Gas turbine rotor
12: Intermediate casing
14: Compressor
14r: Compressor rotor
14c: Compressor casing
15: Combustor
15c: Combustion tube (transition piece)
15n: Fuel nozzle
15i: Ignition plug
16: Turbine
16r: Turbine rotor
16c: Turbine casing
20: Ammonia supply device
21: Ammonia tank
22: Ammonia line
23: Ammonia pump
24: Vaporizer
25: Fuel control valve
26: Purge gas line
27: Purge gas control valve
30: Heat recovery steam generator
31: Duct
32: Heat transfer tube
33: Stack
34: Flow path forming frame
35: Exhaust gas flow path
36: Duct gas flow path
37: Stack gas flow path
41: Steam turbine
42: Main steam line
43: Condenser
44: Supply water line
45: Pump
50: Denitration apparatus
51: Catalyst layer
52: Ammonia sprayer
53: Ammonia water supply line
54: Ammonia water control valve
60, 60a: Sprinkling device
61, 61a: Sprinkler
61h: Ring header
61n: Nozzle
62: Water tank
63: Makeup water supply line
64: Ammonia concentration meter
65: Salt amount detector
66: Water supply device
67: Water line
68: Water supply pump
69: Water control valve
70: Mist eliminator
71, 71a: Water recovery line
74: Ammonia water supply device
75: Ammonia water sub-line
76: Ammonia water sub-control valve
77: Treated water supply device
78: Treated water line
79: Treated water control valve
80: Acid supply device
81: Acid tank
82: Acid line
83: Acid supply pump
84: Acid control valve
89: Wastewater treatment device
90: Control device
91: Gas turbine controller
92: Sprinkling controller

The invention claimed is:

1. A gas turbine facility comprising:
a gas turbine having a combustor;
an ammonia supply device that supplies ammonia to the combustor;
a flow path forming frame forming an exhaust gas flow path through which exhaust gas from the gas turbine flows;
a sprinkling device that is disposed in the exhaust gas flow path and that has a sprinkler that sprinkles water into the exhaust gas flow path; and
a sprinkling controller that controls an operation of the sprinkling device,
wherein the sprinkling controller instructs the sprinkling device to start sprinkling the water on condition that an instruction to start supply of the ammonia to the combustor from the ammonia supply device or an instruction to stop the supply of the ammonia is received.

2. The gas turbine facility according to claim 1,
wherein the sprinkling controller instructs the sprinkling device to stop sprinkling the water after a predetermined time has elapsed after receiving the instruction to start the supply of the ammonia or the instruction to stop the supply of the ammonia, and
an end time point of the predetermined time is a time point after a time point at which unburned ammonia is expected to be no longer exhausted from the gas turbine.

3. The gas turbine facility according to claim 1, further comprising:
a water recovery line that guides a liquid including the water sprinkled into the exhaust gas flow path to an outside of the flow path forming frame.

4. The gas turbine facility according to claim 3, further comprising:
a mist eliminator that collects mist,
wherein the flow path forming frame has a duct connected to the gas turbine,
a duct gas flow path forming at least a part of the exhaust gas flow path is formed in the duct,
the sprinkler is disposed in the duct gas flow path and is configured to sprinkle the water toward a downstream side of a flow of the exhaust gas in the duct gas flow path,
the mist eliminator is disposed downstream of the sprinkler in the duct gas flow path, and
the water recovery line is connected, in the duct, to a position downstream of the mist eliminator in a flow direction of the exhaust gas or to a region where the mist eliminator is disposed in the flow direction of the exhaust gas.

5. The gas turbine facility according to claim 3,
wherein the flow path forming frame includes a duct connected to the gas turbine and a stack connected to the duct,
a stack gas flow path that forms at least a part of the exhaust gas flow path and that extends in a vertical direction is formed in the stack,
the sprinkler is disposed in the stack gas flow path and is configured to sprinkle the water in a direction having a horizontal component, and
the water recovery line is connected to a position below a position where the sprinkler is disposed in the stack.

6. The gas turbine facility according to claim 3,
wherein the sprinkling device includes a water tank that stores the water to be sprinkled in the exhaust gas flow path, and a water supply device that supplies the water in the water tank to the sprinkler, and
the sprinkling controller controls the water supply device.

7. The gas turbine facility according to claim 6, further comprising:
a denitration apparatus that is disposed upstream of the sprinkler in a flow direction of the exhaust gas in the exhaust gas flow path and that removes a nitrogen oxide in the exhaust gas; and
an ammonia water supply device that supplies the water in the water tank to the denitration apparatus,
wherein the water recovery line is connected to the water tank,
the water tank is provided with an ammonia concentration meter that detects an ammonia concentration in the water tank, and
the ammonia water supply device supplies the water in the water tank to the denitration apparatus when the ammonia concentration detected by the ammonia concentration meter becomes equal to or higher than a predetermined concentration.

8. The gas turbine facility according to claim 6, further comprising:
an acid supply device that supplies an acid which produces a salt via reaction with the ammonia into the water tank; and
a treated water supply device that guides the water in the water tank to a wastewater treatment device,
wherein the water recovery line is connected to the water tank,
the water tank is provided with a salt amount detector that detects an amount of the salt in the water tank, and
the treated water supply device guides the water in the water tank to the wastewater treatment device when the amount of the salt detected by the salt amount detector becomes equal to or more than a predetermined amount.

9. A method for suppressing discharge of ammonia from a gas turbine facility, the gas turbine facility including a gas turbine having a combustor, an ammonia supply device that supplies ammonia to the combustor, and a flow path forming frame forming an exhaust gas flow path through which exhaust gas from the gas turbine flows, the method comprising:
performing a sprinkling step of sprinkling water into the exhaust gas flow path,
wherein, in the sprinkling step, sprinkling the water into the exhaust gas flow path is started on condition that an instruction to start supply of the ammonia to the combustor from the ammonia supply device or an instruction to stop the supply of the ammonia is received.

10. The method for suppressing discharge of ammonia from a gas turbine facility according to claim 9,
wherein, in the sprinkling step, after a predetermined time has elapsed after receiving the instruction to start the supply of the ammonia or the instruction to stop the supply of the ammonia, sprinkling the water into the exhaust gas flow path is stopped, and
an end time point of the predetermined time is a time point after a time point at which unburned ammonia is expected to be no longer exhausted from the gas turbine.

* * * * *